US011267500B2

(12) United States Patent
Wilkes et al.

(10) Patent No.: US 11,267,500 B2
(45) Date of Patent: Mar. 8, 2022

(54) STEERING COLUMN ASSEMBLY FOR A VEHICLE

(71) Applicant: ZF Automotive UK Limited, Solihull (GB)

(72) Inventors: Mark Anthony Wilkes, Birmingham (GB); Niclas Davies, Birmingham (GB)

(73) Assignee: ZF Automotive UK Limited

( * ) Notice: Subject to any disclaimer, the term of this patent is extended or adjusted under 35 U.S.C. 154(b) by 0 days.

(21) Appl. No.: 17/010,265

(22) Filed: Sep. 2, 2020

(65) Prior Publication Data

US 2021/0061340 A1 Mar. 4, 2021

(30) Foreign Application Priority Data

Sep. 3, 2019 (GB) ..................................... 1912647

(51) Int. Cl.
*B62D 1/185* (2006.01)
*B62D 1/183* (2006.01)
*B62D 1/181* (2006.01)
*F16H 25/20* (2006.01)

(52) U.S. Cl.
CPC ............. *B62D 1/183* (2013.01); *B62D 1/181* (2013.01); *B62D 1/185* (2013.01); *F16H 25/20* (2013.01); *F16H 2025/2059* (2013.01); *F16H 2025/2084* (2013.01)

(58) Field of Classification Search
CPC ........ B62D 1/183; B62D 1/181; B62D 1/185; B62D 1/16; B62D 1/18; F16H 25/20; F16H 2025/2084; F16H 2025/2062
See application file for complete search history.

(56) References Cited

U.S. PATENT DOCUMENTS

| 2017/0029009 | A1* | 2/2017 | Rouleau | ................. | B62D 1/183 |
| 2019/0210633 | A1* | 7/2019 | Derocher | ............... | B62D 1/183 |
| 2021/0229733 | A1* | 7/2021 | Kurokawa | ............. | B62D 1/187 |

FOREIGN PATENT DOCUMENTS

| CN | 112109796 A | * | 12/2020 | | |
| EP | 3730381 A1 | * | 10/2020 | ........... | B60R 21/203 |
| WO | WO-2015140205 A1 | * | 9/2015 | ............. | B62D 1/185 |
| WO | 2018202672 A2 | | 11/2018 | | |

* cited by examiner

*Primary Examiner* — James A English
*Assistant Examiner* — Matthew D Lee
(74) *Attorney, Agent, or Firm* — Robert James Harwood

(57) ABSTRACT

A steering column assembly for a vehicle includes a base configured for attachment to a vehicle; an elongate steering column, a movable steering column support, a first guide means, a displaceable carriage, a second guide means as well as first and second displacement means. The steering column may be movably mounted on the base. The first guide means may constrain the steering column support into displacement in a direction parallel to the longitudinal axis of the steering column. The displaceable carriage may be located between the movable steering column support and base. The second guide means may constrain the carriage into displacement in a direction parallel to the longitudinal axis of the steering column. The first displacement means may displace the steering column support with respect to the carriage. The second displacement means may simultaneously displace the carriage with respect to the base.

20 Claims, 4 Drawing Sheets

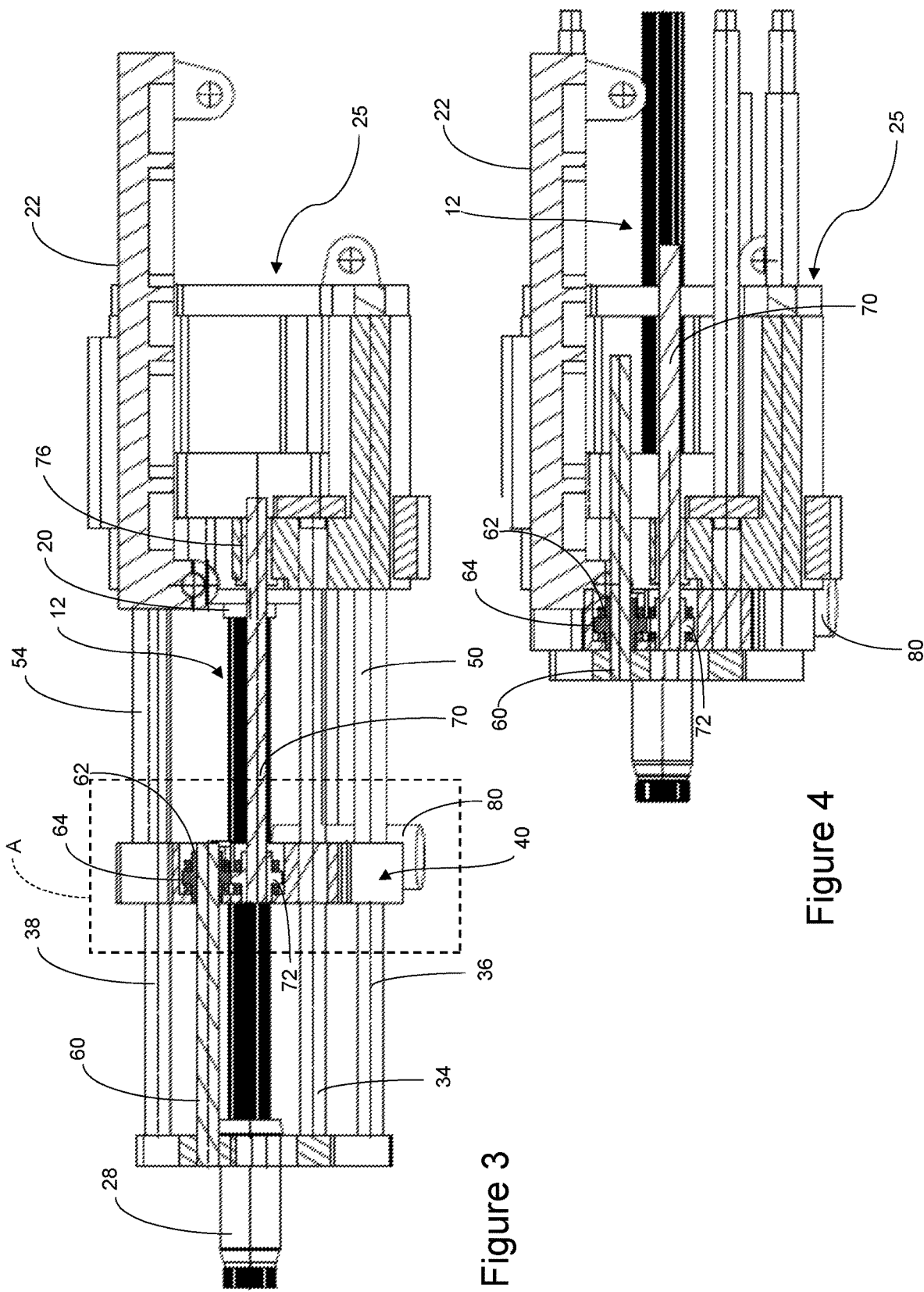

STEERING COLUMN ASSEMBLY FOR A VEHICLE

CROSS-REFERENCE TO RELATED APPLICATION

This application claims priority to UK Patent Application No. 1912647.3 filed Sep. 3, 2019, the disclosure of which is incorporated herein by reference in its entirety.

TECHNICAL FIELD

The present disclosure relates to steering column assemblies for motor vehicles and in particular, but not exclusively, to retractable steering column assemblies for autonomous vehicles.

BACKGROUND

Autonomous vehicles are intended to be used primarily in autonomous mode, in which control of the vehicle is carried out without manual intervention. However, it is desirable for autonomous vehicles to be controllable manually if necessary or desired, and for that reason vehicle controls such as a steering wheel (typically having a "steer-by-wire" operation) must be provided. It is desirable for the steering wheel of such autonomous vehicles to be moved into a stowed condition during autonomous control of the vehicle in order to maximise the space available within the vehicle and for the steering wheel to be moved into an extended, deployed condition for manual control.

One way of achieving longitudinal adjustment of a steering column is by use of an elongate lead screw which is connected to the steering column so that as the lead screw is displaced longitudinally, the steering column is also displaced. This can be achieved either by having a non-rotatable lead screw which is engageable with a nut member whose position is fixed but which is rotatable by means of gearing connected to an electric motor, or by having a rotatable lead screw which is rotatable by means of an electric motor and which is engaged with a non-rotatable nut member. By operating the electric motor, the position of the steering column can be adjusted.

Such arrangements have a single long lead screw with a long, unsupported length, resulting in a detrimental effect on the stiffness of the assembly and potentially introducing vibration issues. In addition, it is necessary for the packaging of the steering column assembly to accommodate the whole length of the lead screw, which can have adverse effects on the compactness of the assembly.

Moreover, the speed of displacement of the steering column is governed by the speed of rotation of the rotatable element of the lead screw/nut configuration.

SUMMARY

In accordance with the present disclosure, a steering column assembly for a vehicle includes a base configured for attachment to a vehicle; an elongate steering column configured at one end for attachment of a steering wheel, a movable steering column support, a first guide means, a displaceable carriage, a second guide means as well as first and second displacement means. The steering column may be movably mounted on the base and may be displaceable along its longitudinal axis with respect to the base. The movable steering column support may be attached to the steering column. The first guide means may constrain the steering column support into displacement in a direction parallel to the longitudinal axis of the steering column. The displaceable carriage may be located between the movable steering column support and the base. The second guide means may constrain the carriage into displacement in a direction parallel to the longitudinal axis of the steering column. The first displacement means may displace the steering column support with respect to the carriage and the second displacement means may simultaneously displace the carriage with respect to the base.

By being able to displace the steering column support with respect to the carriage and simultaneously displaced the carriage with respect to the base, a much faster displacement of the steering column can be achieved.

Preferably, the first displacement means comprises an elongate lead screw extending between the movable steering column support and the displaceable carriage.

Preferably, the second displacement means comprises an elongate lead screw extending between the displaceable carriage and the base.

By having two lead screws instead of a single, longer lead screw, each lead screw has a much shorter unsupported length as compared with the prior art, which reduces unwanted vibration in the steering column assembly. In addition, the use of two smaller lead screws allows for a more compact assembly and reduces the space required for installation.

Preferably, one of the first and second displacement means comprises a fixed lead screw engaged with a rotatable, complementarily-threaded member mounted on the carriage.

Preferably, one of the first and second displacement means comprises a rotatably mounted lead screw threadedly engaged with a non-rotatable complementarily threaded member.

Preferably, the rotatable, complementarily-threaded member engaged with the fixed lead screw and the rotatably mounted lead screw are engaged with each other whereby rotation of one results in rotation of the other.

For example, the rotatable, complementarily-threaded member and the rotatably mounted lead screw may each be provided with a gear, for example a pinion, the two gears being engaged with each other.

In one embodiment, the steering column comprises a fixed lead screw extending between the movable steering column support and the displaceable carriage and a rotatably mounted lead screw rotatably mounted on the carriage and threadedly engaged with a non-rotatable complementarily threaded member which is fixed with respect to the base.

Preferably, the steering column assembly comprises a motor mounted on the carriage, for example an electric motor.

Preferably, the output of the motor is configured to rotate the complementarily-threaded member and the rotatably mounted lead screw.

Preferably, the base comprises a first portion configured for attachment to a vehicle and a second portion movably mounted on the first portion, the steering column being mounted on the second portion of the base.

In one embodiment, the second portion of the base is pivotally mounted with respect to the first portion of the base.

This allows the rake of the steering column to be adjusted, if desired.

BRIEF DESCRIPTION OF THE DRAWINGS

By way of example only, a specific embodiment of the present disclosure will now be described with reference to the accompanying drawings, in which:

FIG. 3 is a first vertical cross-section view through the steering wheel retraction mechanism of FIG. 1, looking in the direction of arrows A-A in FIG. 2;

FIG. 4 is a second vertical cross-section view through the steering wheel retraction mechanism of FIG. 1, looking in the direction of arrows A-A in FIG. 2.

DETAILED DESCRIPTION

Figure 1:
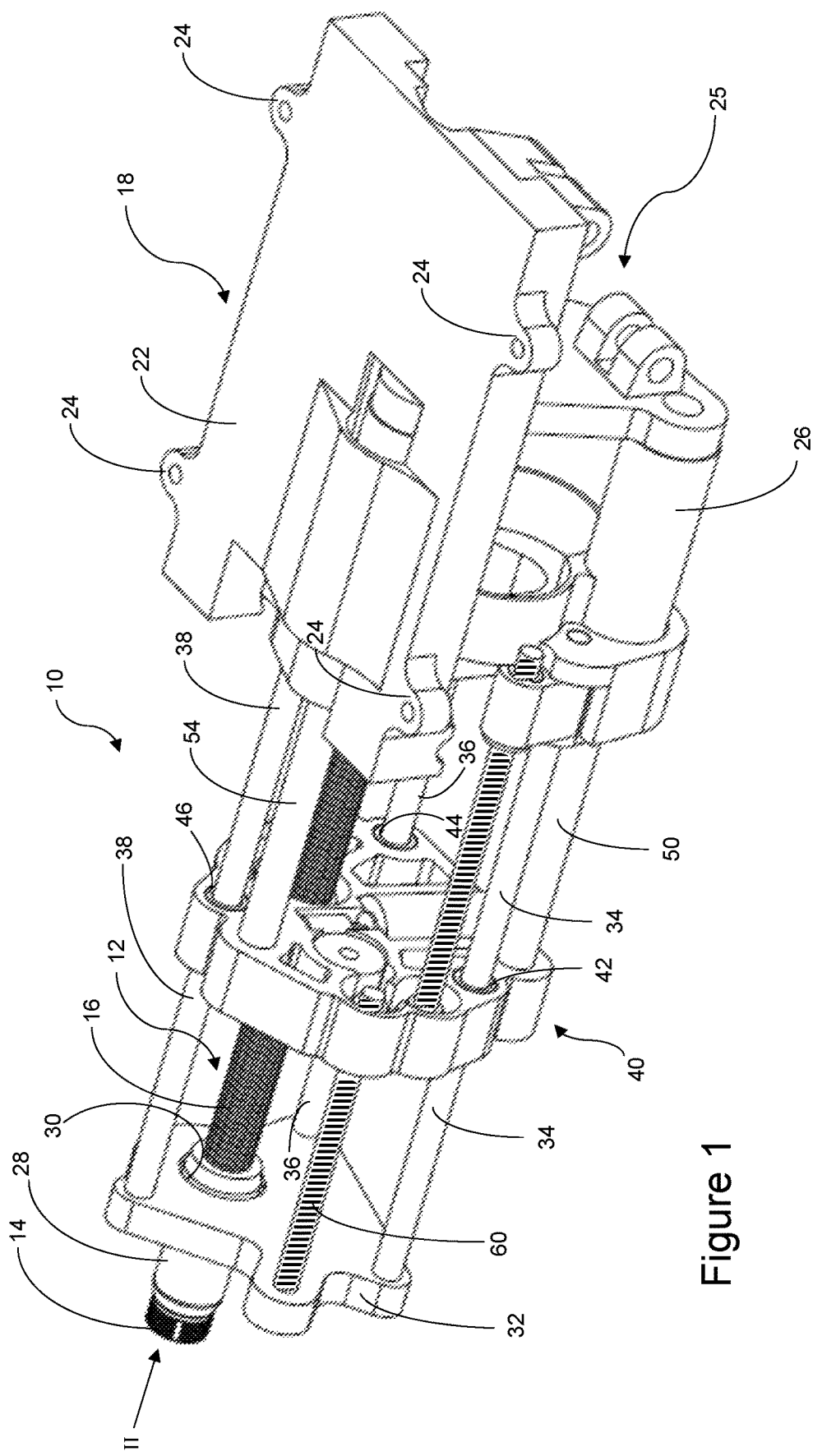
FIG. 1 is a perspective view of an embodiment of steering wheel retraction mechanism in accordance with the present disclosure.
Figure 2:
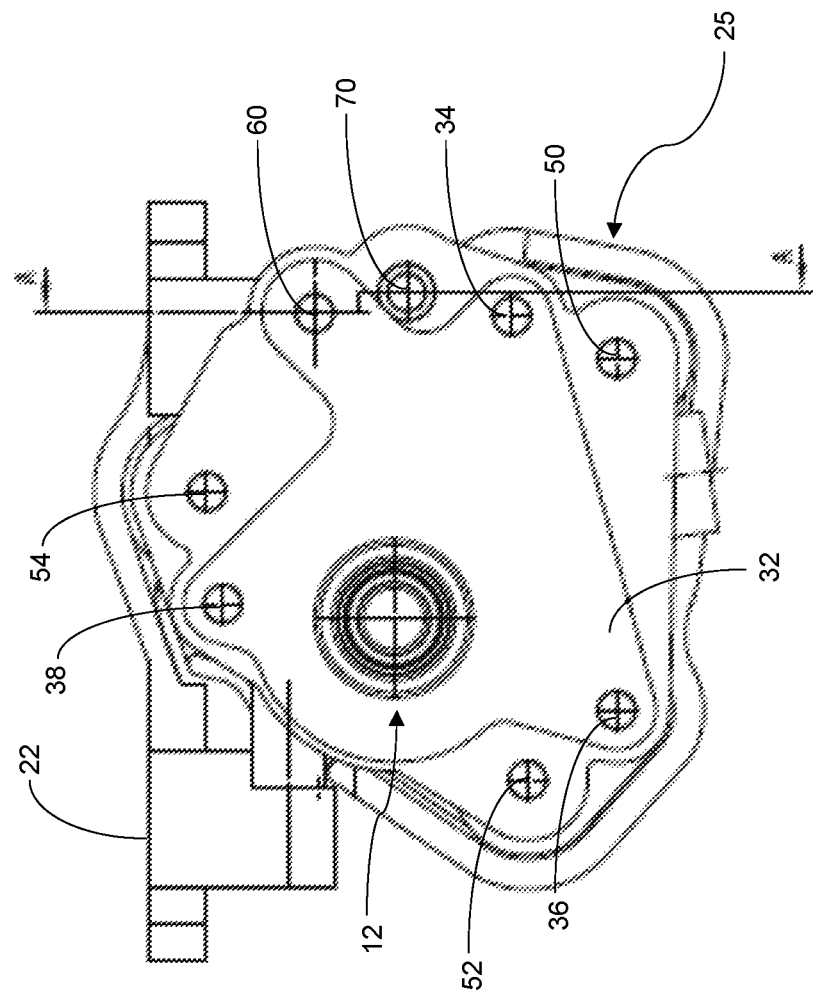
FIG. 2 is an end view of the steering wheel retraction mechanism of FIG. 1; looking in the direction of arrow II in FIG. 1.

A steering column assembly 10 for a vehicle comprises an elongate rigid steering column 12 to one end 14 of which a steering wheel (not shown) is connected in use, the steering column 12 comprising a rotatably mounted steering shaft 16.

The steering column 12 is slidably mounted on a base indicated generally at 18, by means of a bushing 20 within the base (see FIG. 3), The base 18 comprises a generally rectangular upper mounting plate 22 having an apertured mounting lug 24 adjacent to each of its corners, by means of which the base can be secured to a vehicle, and a lower body 25 pivotally mounted to the upper mounting plate to allow the rake of the steering column to be adjusted. The base is also formed into a number of sockets, such as that shown at 26, for receipt of guide rods, as will be explained.

The outer, front end of the steering column 12 is provided with a cylindrical sleeve 28 which passes through, and is secured in, a circular aperture 30 in a planar steering column support plate 32, so that the steering column 12 and the steering column support plate 32 are constrained to move together. Three identical, cylindrical, parallel guide rods 34, 36, 38 extend perpendicularly from the inner face of the steering column support plate 32 and parallel to the longitudinal axis of the steering column 12. The guide rods 34, 36, 38 are slidably received in complementarily-shaped sockets (not shown) in the base 18, such that the steering column support plate 32, and therefore the steering column 12, is constrained to be displaceable in a direction parallel to the longitudinal axis of the steering column 12.

An intermediate mounting plate 40 forming a movable carriage is located between the lower body 25 of the base 18 and the steering column support plate 32. The guide rods 34, 36, 38 pass slidably through corresponding bushings 42, 44, 46 in the carriage 40. Three further identical, cylindrical guide rods 50, 52, 54 of slightly greater diameter than the guide rods 34, 36, 38 also extend parallel to the longitudinal axis of the steering column 12 and to the guide rods 34, 36, 38 and extend from the inner, front face of the carriage 40 and are slidably received in complementarily-shaped sockets (one of which is shown at 26) in the lower body 25 of the base 18.

Figure 5:
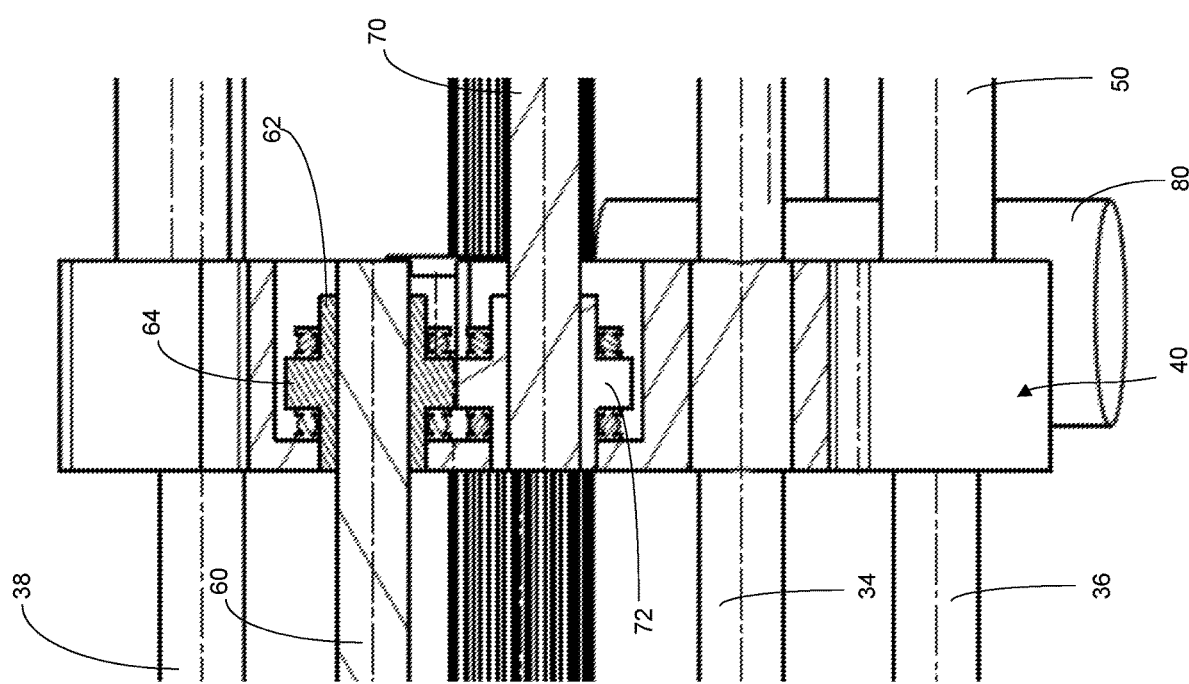
FIG. 5 is a view of the portion of FIG. 3 shown at "A", to an enlarged scale.

A first, fixed elongate lead screw 60 is fixedly secured to, and extends from the inner, rear face of the steering column support plate 32 in a direction parallel to the longitudinal axes of the steering column 12 and the guide rods 34, 36, 38, 50, 52, 54. As best seen in FIGS. 3 to 5, the first lead screw 60 is screw-threadedly engaged with a nut 62 which is rotatably mounted within the carriage 40. Since the lead screw 60 is fixedly secured to the steering column support plate 32 and is prevented from rotating, rotation of the nut 62 draws the lead screw 60 through the nut 62 (in a direction as determined by the direction of rotation of the nut) and results in displacement of the lead screw 60, and therefore of the steering column support plate 32 to which the lead screw is attached. Since the steering column 12 is secured to the steering column support plate 32, rotation of the nut 62 also results in displacement of the steering column 12. The outer face of the nut 62 is also provided with a pinion gear 64.

A second elongate lead screw 70 is rotatably mounted on the carriage 40 and extends parallel to the longitudinal axes of the steering column 12 and the guide rods 34, 36, 38, 50, 52, 54. The inner, front end of the second lead screw 70 is provided with a pinion 72 identical to the pinion formation 64 on the nut 62 and the two pinions 64, 72 mesh with each other so that rotation of the nut 62 results in rotation of the second lead screw 70.

The opposite end of the lead screw 70 is received in a complementarily-threaded bushing 76 which forms part of the lower body 25 of the base 18, whereby rotation of the second lead screw 70 causes the lead screw 70 to be drawn through the threaded bushing 76 (in a direction as determined by the direction of rotation of the lead screw 70) and thereby results in displacement of the carriage 40 with respect to the lower body 25 of the base 18.

An electric motor 80 is mounted on the carriage 40. The output of the motor 80 is connected to a helical spur gear 82 which is engaged with a gear wheel 84 whose output is connected to the nut 62. Actuation of the motor 80 therefore results in rotation of both the nut 62 and of the second lead screw 70 which is constrained to rotate with the nut 62 by virtue of the meshed pinion gears 64, 72 on the nut 62 and the rotatable second lead screw 70.

The steering column assembly 10 shown in FIGS. 1 and 3 show the assembly in its maximum extended position, namely with the steering column 12 extended from the lower body 25 of the base 18 to its maximum extent. When it is desired to adjust the position of the steering wheel (not shown) connected to the outer, front end of the steering column 12, the motor 80 is actuated. As explained previously, this results in rotation of the nut 62 mounted on the carriage 40 and of the rotatably mounted second lead screw 70, since the nut 62 and second lead screw 70 rotate together, by virtue of the inter-meshing pinions 64, 72 secured to the nut 62 and second lead screw 70 respectively.

Rotation of the nut 62 causes the first lead screw 60 to move with respect to the carriage 40, and causes the steering column support plate 30 to be drawn towards the carriage 40. Simultaneously, rotation of the second lead screw 70 causes the second lead screw 70 to be drawn further through the threaded bushing 76 and causes the carriage 40 to be drawn towards the base 18. Consequently, by actuation of the motor 80, the carriage 40 is drawn towards the base 18 and simultaneously the steering column support plate 32 is drawn towards the carriage 40. Since the steering column 12 is constrained to move with the steering column support plate 32, actuation of the motor 80 causes the steering column 12 to be moved with respect to the base 18 at twice the speed as compared with an arrangement having a single lead screw.

The provision of two separate, shorter lead screws is also increases the stiffness of the assembly, resulting in reduced vibration, and allows a more compact packaging of the assembly.

The disclosure is not restricted to the details of the foregoing embodiment.

For example, instead of the two lead screws, the steering column support plate and the carriage 40 could be displaced by other means, such as a toothed rack and associated pinion or a driven wheel frictionally engaged with a suitable displaceable longitudinally-extending surface.

What is claimed is:

1. A steering column assembly for a vehicle, comprising:
    a base configured for attachment to a vehicle;
    an elongate steering column configured at one end for attachment of a steering wheel, the steering column being movably mounted on the base and being displaceable along its longitudinal axis with respect to the base;
    a movable steering column support to which the steering column is attached;
    a first guide means for constraining the steering column support into displacement in a direction parallel to the longitudinal axis of the steering column;
    a displaceable carriage located between the movable steering column support and the base;
    a second guide means for constraining the carriage into displacement in a direction parallel to the longitudinal axis of the steering column;
    a first displacement means for displacing the steering column support with respect to the carriage;
    a second displacement means for simultaneously displacing the carriage with respect to the base; and
    a motor operatively connected to at least one of the first and second displacement means, actuation of the motor simultaneously causing both the steering column support to be displaced with respect to the carriage and the carriage to be displaced with respect to the base.

2. The steering column assembly as defined in claim 1, wherein the first displacement means comprises an elongate lead screw extending between the movable steering column support and the displaceable carriage.

3. The steering column assembly as defined in claim 1, wherein the second displacement means comprises an elongate lead screw extending between the displaceable carriage and the base.

4. The steering column assembly as defined in claim 1, wherein one of the first and second displacement means comprises a fixed lead screw engaged with a rotatable, complementarily-threaded member mounted on the carriage.

5. The steering column assembly as defined in claim 4, wherein one of the first and second displacement means comprises a rotatably mounted lead screw threadedly engaged with a non-rotatable complementarily threaded member.

6. The steering column assembly as defined in claim 5, wherein the rotatable, complementarily-threaded member engaged with the fixed lead screw and the rotatably mounted lead screw are engaged with each other whereby rotation of one results in rotation of the other.

7. The steering column assembly as defined in claim 6, wherein the rotatable, complementarily-threaded member and the rotatably mounted lead screw are each provided with a gear, the two gears being engaged with each other.

8. The steering column assembly as defined in claim 7, wherein the rotatable, complementarily-threaded member and the rotatably mounted lead screw are each provided with a pinion.

9. The steering column assembly as defined in claim 1, wherein the first displacement means comprises a fixed lead screw extending between the movable steering column support and the displaceable carriage and the second displacement means comprises a rotatably mounted lead screw rotatably mounted on the carriage and threadedly engaged with a non-rotatable complementarily threaded member which is fixed with respect to the base.

10. The steering column assembly as defined in claim 9, wherein the motor is mounted on the carriage.

11. The steering column assembly as defined in claim 10, wherein the motor comprises an electric motor.

12. The steering column assembly as defined in claim 10, wherein the fixed lead screw is engaged with a rotatable, complementarily-threaded member mounted on the carriage, the output of the motor being configured to rotate the complementarily-threaded member and the rotatably mounted lead screw.

13. The steering column assembly as defined in claim 12, wherein the base comprises a first portion configured for attachment to a vehicle and a second portion movably mounted on the first portion, the steering column being mounted on the second portion of the base.

14. The steering column assembly as defined in claim 13, wherein the second portion of the base is pivotally mounted with respect to the first portion of the base.

15. The steering column assembly as defined in claim 1, wherein the motor comprises a single motor so that both the steering column support is displaced with respect to the carriage and the carriage is displaced with respect to the base by only one motor.

16. A steering column assembly for a vehicle, comprising:
    a base configured for attachment to the vehicle;
    an elongate steering column configured at one end for attachment of a steering wheel, the steering column being movably mounted on the base and being displaceable along its longitudinal axis with respect to the base;
    a movable steering column support to which the steering column is attached;
    a first guide means for constraining the steering column support into displacement in a direction parallel to the longitudinal axis of the steering column;
    a displaceable carriage located between the movable steering column support and the base;
    a second guide means for constraining the carriage into displacement in a direction parallel to the longitudinal axis of the steering column;
    a first displacement means for displacing the steering column support with respect to the carriage; and
    a second displacement means for simultaneously displacing the carriage with respect to the base, one of the first and second displacement means comprising a fixed lead screw engaged with a rotatable, complementarily-threaded member mounted on the carriage.

17. The steering column assembly as defined in claim 16, wherein one of the first and second displacement means comprises a rotatably mounted lead screw threadedly engaged with the rotatable, complementarily-threaded member such that rotation of one results in rotation of the other.

18. A steering column assembly for a vehicle, comprising:
    a base configured for attachment to the vehicle;
    an elongate steering column configured at one end for attachment of a steering wheel, the steering column being movably mounted on the base and being displaceable along its longitudinal axis with respect to the base;
    a movable steering column support to which the steering column is attached;
    a first guide means for constraining the steering column support into displacement in a direction parallel to the longitudinal axis of the steering column;

a displaceable carriage located between the movable steering column support and the base;

a second guide means for constraining the carriage into displacement in a direction parallel to the longitudinal axis of the steering column;

a first displacement means for displacing the steering column support with respect to the carriage;

a second displacement means for simultaneously displacing the carriage with respect to the base; and a rotatable member mounted on the carriage and engaging each of the first and second displacement means, rotation of the rotatable member causing rotation of one of the first and second displacement means.

19. The steering column assembly as defined in claim 18, wherein the rotatable member is a nut rotatably mounted on the carriage.

20. The steering column assembly as defined in claim 19, wherein the first displacement means comprises a fixed lead screw extending between the movable steering column support and the displaceable carriage, rotation of the nut drawing the fixed lead screw through the nut to displace the fixed lead screw, displacement of fixed lead screw causing the steering column support to be displaced with respect to the carriage, and the second displacement means comprises a rotatably mounted lead screw rotatably mounted on the carriage and threadedly engaged with a non-rotatable complementarily threaded member which is fixed with respect to the base, rotation of the nut causing the rotatably mounted lead screw to rotate, rotation of the rotatably mounted lead screw causing the carriage to be displaced relative to the base.

* * * * *